US011997563B2

(12) United States Patent
Opshaug et al.

(10) Patent No.: US 11,997,563 B2
(45) Date of Patent: May 28, 2024

(54) ENHANCEMENTS TO OBSERVED TIME DIFFERENCE OF ARRIVAL POSITIONING OF A MOBILE DEVICE

(71) Applicant: QUALCOMM Incorporated, San Diego, CA (US)

(72) Inventors: Guttorm Ringstad Opshaug, Redwood City, CA (US); Sven Fischer, Nuremberg (DE); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/593,153

(22) Filed: May 11, 2017

(65) Prior Publication Data

US 2018/0146332 A1 May 24, 2018

Related U.S. Application Data

(60) Provisional application No. 62/426,157, filed on Nov. 23, 2016.

(51) Int. Cl.
*H04W 4/02* (2018.01)
*G01S 5/00* (2006.01)
(Continued)

(52) U.S. Cl.
CPC ........... *H04W 4/023* (2013.01); *G01S 5/0036* (2013.01); *G01S 5/10* (2013.01); *G01S 5/0236* (2013.01);
(Continued)

(58) Field of Classification Search
CPC .... H04W 4/023; H04W 72/042; H04W 24/08
See application file for complete search history.

(56) References Cited

U.S. PATENT DOCUMENTS 9,338,591 B1 * 5/2016 Vivanco ............ H04W 36/0088
9,432,809 B2 8/2016 Fischer et al.
(Continued)

FOREIGN PATENT DOCUMENTS

| CN | 102472809 | 5/2012 |
|----|-----------|--------|
| CN | 103004267 | 3/2013 |

(Continued)

OTHER PUBLICATIONS

Fischer S., "Observed Time Difference of Arrival (OTDOA) Positioning in 3GPP LTE", Jun. 6, 2014 (Jun. 6, 2014), 62 Pages, XP055284784, Retrieved from the Internet: URL: http://www.terranautx.com/s/Qualcomm-OTDOA-positioning-in-LTE-June-2014.pdf.

(Continued)

*Primary Examiner* — Muthuswamy G Manoharan
(74) *Attorney, Agent, or Firm* — Weaver Austin Villenueve & Sampson LLP

(57) ABSTRACT

A mobile station performs Observed Time Difference of Arrival (OTDOA) positioning by measuring a time of arrival (TOA) of downlink signals transmitted from a reference cell and one or more neighbor cells. Reference Signal Time Differences (RSTDs) are generated using TOA measurements from the reference cell and each neighbor cell. The mobile station reports to a location server location information, including the RSTD measurements and the times of measurement for the TOA measurements. The mobile station may further generate and report additional RSTD and/or TOA measurements and associated times of measurement for the reference cell and/or neighbor cells. A location server may use the RSTD measurements, the times of measurement and any TOA measurements to determine a position of the mobile station taking into account user motion and base (Continued)

station clock drift and/or may adjust the uncertainty of the resulting position.

16 Claims, 9 Drawing Sheets

(51) Int. Cl.
    *G01S 5/10*           (2006.01)
    *H04W 24/08*        (2009.01)
    *H04W 72/04*        (2023.01)
    *G01S 5/02*          (2010.01)
    *G01S 19/25*         (2010.01)
    *G01S 19/42*         (2010.01)
    *G01S 19/46*         (2010.01)

(52) U.S. Cl.
    CPC ............... *G01S 19/25* (2013.01); *G01S 19/42* (2013.01); *G01S 19/46* (2013.01)

(56) References Cited

U.S. PATENT DOCUMENTS

| | | | | |
|---|---|---|---|---|
| 2010/0331013 A1* | 12/2010 | Zhang | ................ | H04W 64/003 455/456.2 |
| 2011/0207477 A1* | 8/2011 | Siomina | ............... | H04B 17/309 455/456.2 |
| 2012/0184301 A1* | 7/2012 | Jovicic | .................. | G01S 5/0252 455/456.5 |
| 2014/0018098 A1* | 1/2014 | Racz | ....................... | G01S 5/021 455/456.1 |
| 2014/0176366 A1 | 6/2014 | Fischer et al. | | |
| 2014/0349582 A1 | 11/2014 | Xiao et al. | | |
| 2016/0223641 A1* | 8/2016 | Cheng | .................. | G01S 5/0036 |
| 2016/0295374 A1 | 10/2016 | Persson et al. | | |
| 2017/0150436 A1* | 5/2017 | Modarres Razavi | ....................... | G01S 5/0215 |
| 2017/0280415 A1* | 9/2017 | Kim | ....................... | G01S 5/0236 |
| 2019/0223140 A1* | 7/2019 | Grossmann | ........... | G01S 5/0273 |
| 2019/0285721 A1 | 9/2019 | Xiong et al. | | |

FOREIGN PATENT DOCUMENTS

| | | |
|---|---|---|
| KR | 101086126 B1 | 11/2011 |
| KR | 20140081498 A | 7/2014 |
| WO | 2014106976 A1 | 7/2014 |
| WO | WO 2015006046 | 1/2015 |
| WO | 2015145217 A1 | 10/2015 |
| WO | WO 2016182495 | 11/2016 |

OTHER PUBLICATIONS

International Search Report and Written Opinion—PCT/US2017/053231—ISA/EPO—dated Dec. 5, 2017.

* cited by examiner

400

---

410

Perform a plurality of time of arrival (TOA) measurements of downlink (DL) signals transmitted from a reference cell and a neighbor cell

---

420

Generate a first Reference Signal Time Difference (RSTD) using a first TOA measurement of a first DL signal from the reference cell and a second TOA measurement of a second DL signal from the neighbor cell

---

430

Report location information to a location server for OTDOA positioning of the mobile station, wherein the location information comprises the first RSTD and at least one measurement time, wherein the at least one measurement time is based on a time of measurement for the first TOA measurement and a time of measurement for the second TOA measurement

Receive location information from a mobile station for OTDOA positioning of the mobile station, the location information comprising an Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement

520
Use the location information to determine a location of the mobile station.

FIG. 5

ENHANCEMENTS TO OBSERVED TIME DIFFERENCE OF ARRIVAL POSITIONING OF A MOBILE DEVICE

CLAIM OF PRIORITY UNDER 35 U.S.C. § 119

This application claims under 35 USC § 119 the benefit of and priority to U.S. Provisional Application No. 62/426,157, filed Nov. 23, 2016, and entitled "ENHANCEMENTS TO OBSERVED TIME DIFFERENCE OF ARRIVAL POSITIONING OF A MOBILE DEVICE" which is assigned to the assignee hereof and is incorporated herein by reference in its entirety.

BACKGROUND

Background Field

The subject matter disclosed herein relates to wireless communications systems, and more particularly to methods and apparatuses for position location of a user equipment in a wireless communications system.

Relevant Background

It is often desirable to know the location of a mobile station such as a cellular phone. For example, a location services (LCS) client may desire to know the location of a mobile station in the case of an emergency services call or to provide some service to the user of the mobile station such as navigation assistance or direction finding. The terms "location", "location estimate", "position", "position estimate" and "position fix" are synonymous and are used interchangeably herein.

In Observed Time Difference of Arrival (OTDOA) based positioning, the mobile station may measure time differences between downlink (DL) signals received from a plurality of base stations. Because the positions of the base stations can be known, the observed time differences between DL signals received from the base stations may be used to calculate the location of the mobile station (e.g. using multilateration techniques). In OTDOA, the mobile station typically measures the time of arrival (TOA) of DL signals received from a reference cell (e.g., the serving cell) and one or more neighboring cells. The TOA for the reference cell is subtracted from the TOA for each of the neighbor cells to determine the Reference Signal Time Difference (RSTD) between the reference cell and each neighbor cell. Using the RSTD measurements, the absolute or relative transmission timing of each cell, and the known position(s) of the base station physical transmitting antennas for the reference and neighboring cells, the mobile station's position may be calculated.

SUMMARY

A mobile station performs Observed Time Difference of Arrival (OTDOA) positioning by measuring a time of arrival (TOA) of downlink signals transmitted from a reference cell and a neighbor cell. A Reference Signal Time Difference (RSTD) is generated using TOA measurements from the reference cell and the neighbor cell. The mobile station reports to a location server location information for OTDOA positioning, including the RSTD and the time of measurement for the TOA measurements. Additionally, the mobile station may generate multiple RSTD measurements from different times for each neighbor cell, and report the RSTD measurements along with a time of measurement for the TOA measurements used in each RSTD measurement. A location server may use the one or more RSTDs and time of measurements to determine a position of the mobile station taking into account user motion and/or may adjust the uncertainty of the resulting position.

In one implementation, a method of performing Observed Time Difference of Arrival (OTDOA) positioning at a mobile station includes performing a plurality of time of arrival (TOA) measurements of downlink (DL) signals transmitted from a reference cell and a neighbor cell; generating a first Reference Signal Time Difference (RSTD) using a first TOA measurement of a first DL signal from the reference cell and a second TOA measurement of a second DL signal from the neighbor cell; and reporting location information to a location server for OTDOA positioning of the mobile station, wherein the location information comprises the first RSTD and at least one measurement time, wherein the at least one measurement time is based on a time of measurement for the first TOA measurement and a time of measurement for the second TOA measurement.

In one implementation, a mobile station for performing Observed Time Difference of Arrival (OTDOA) includes a wireless transceiver configured to wirelessly communicate with a wireless network and to receive downlink (DL) signals transmitted from a reference cell and a neighbor cell; and at least one processor coupled to the wireless transceiver and configured to perform a plurality of time of arrival (TOA) measurements of the DL signals transmitted from the reference cell and the neighbor cell, generate a first Reference Signal Time Difference (RSTD) using a first TOA measurement of a first DL signal from the reference cell and a second TOA measurement of a second DL signal from the neighbor cell, and cause the wireless transceiver to report location information to a location server for OTDOA positioning of the mobile station, wherein the location information comprises the first RSTD and at least one measurement time, wherein the at least one measurement time is based on a time of measurement for the first TOA measurement and a time of measurement for the second TOA measurement.

In one implementation, a mobile station for performing Observed Time Difference of Arrival (OTDOA) includes means for performing a plurality of time of arrival (TOA) measurements of downlink (DL) signals transmitted from a reference cell and a neighbor cell; means for generating a first Reference Signal Time Difference (RSTD) using a first TOA measurement of a first DL signal from the reference cell and a second TOA measurement of a second DL signal from the neighbor cell; and means for reporting location information to a location server for OTDOA positioning of the mobile station, wherein the location information comprises the first RSTD and at least one measurement time, wherein the at least one measurement time is based on a time of measurement for the first TOA measurement and a time of measurement for the second TOA measurement.

In one implementation, a non-transitory computer readable medium having stored therein computer executable instructions executable by one or more processing units of a mobile station for performing Observed Time Difference of Arrival (OTDOA) includes program code to perform a plurality of time of arrival (TOA) measurements of downlink (DL) signals transmitted from a reference cell and a neighbor cell; program code to generate a first Reference Signal Time Difference (RSTD) using a first TOA measurement of a first DL signal from the reference cell and a second TOA measurement of a second DL signal from the neighbor cell; and program code to report location information to a location server for OTDOA positioning of the mobile station, wherein the location information comprises the first RSTD and at least one measurement time, wherein the at least one measurement time is based on a time of measurement for the first TOA measurement and a time of measurement for the second TOA measurement.

In one implementation, a method of performing Observed Time Difference of Arrival (OTDOA) positioning at a location server includes receiving location information from a mobile station for OTDOA positioning of the mobile station, the location information comprising an Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement; and using the location information to determine a location of the mobile station.

In one implementation, a location server for performing Observed Time Difference of Arrival (OTDOA) positioning includes a communications interface configured to communicate with a mobile station; and at least one processor coupled to the communications interface and configured to receive location information from the mobile station for OTDOA positioning of the mobile station, the location information comprising an Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement, and use the location information to determine a location of the mobile station.

In one implementation, a location server for performing Observed Time Difference of Arrival (OTDOA) positioning includes means for receiving location information from a mobile station for OTDOA positioning of the mobile station, the location information comprising an Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement; and means for using the location information to determine a location of the mobile station.

In one implementation, a non-transitory computer readable medium having stored therein computer executable instructions executable by one or more processing units of a location server for performing Observed Time Difference of Arrival (OTDOA) positioning includes program code to receive location information from a mobile station for OTDOA positioning of the mobile station, the location information comprising an Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement; and program code to use the location information to determine a location of the mobile station.

BRIEF DESCRIPTION OF THE DRAWINGS

FIG. 4 shows a flowchart for an exemplary method for performing Observed Time Difference of Arrival (OTDOA) positioning with a mobile station in a manner consistent with disclosed embodiments.

FIG. 5 shows a flowchart for an exemplary method for performing Observed Time Difference of Arrival (OTDOA) positioning with a location server in a manner consistent with disclosed embodiments.

Figure 1:
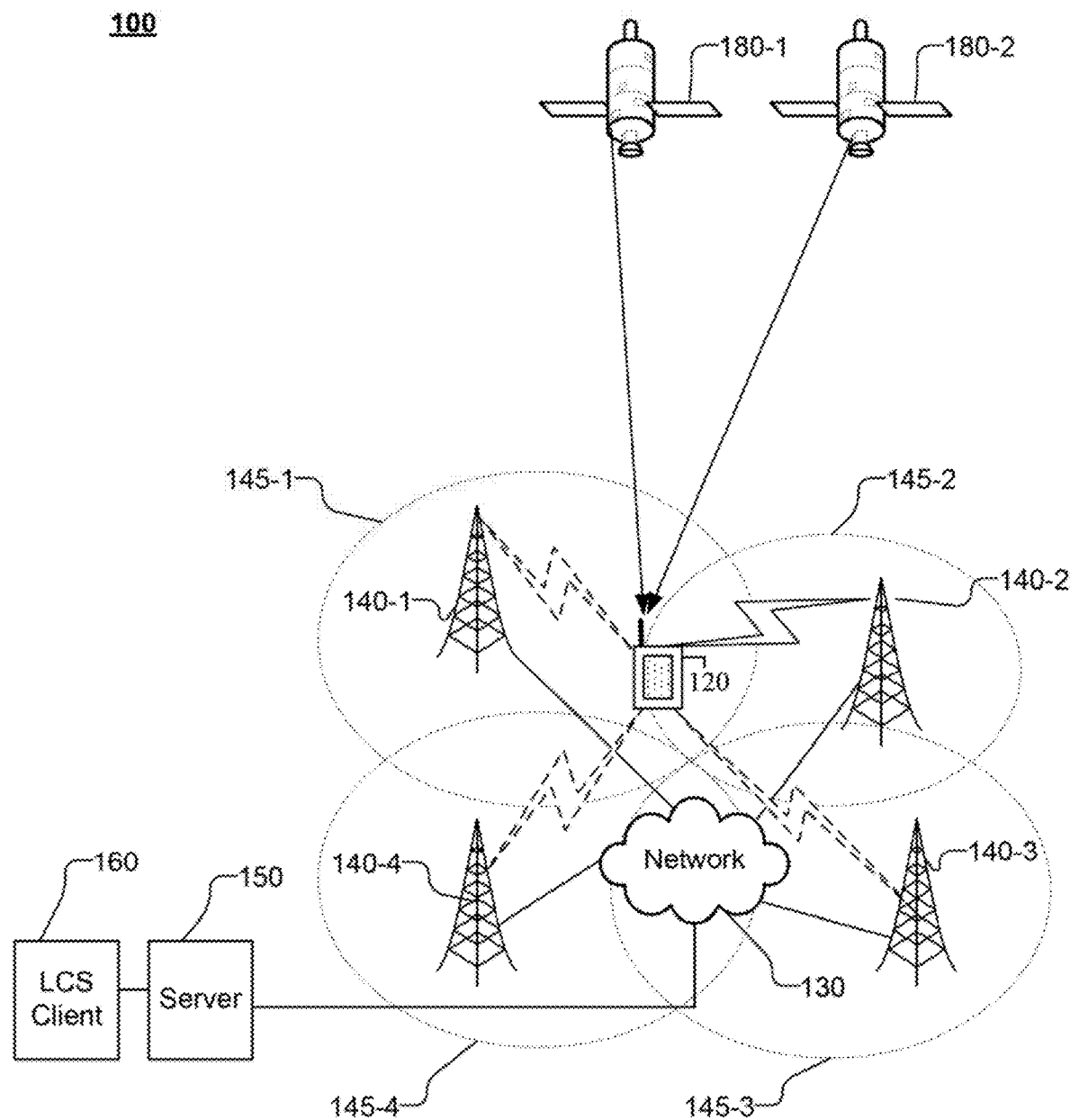
FIG. 1 shows an architecture of an exemplary system capable of providing location services to a mobile station.

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element. For example, FIG. 1 contains four distinct network cells, labelled 145-1, 145-2, 145-3 and 145-4. A reference to a cell 140 then corresponds to any of the cells 145-1, 145-2, 145-3 and 145-4.

DETAILED DESCRIPTION

The terms "mobile station" (MS), "user equipment" (UE) and "target" are used interchangeably herein and may refer to a device such as a cellular or other wireless communication device, personal communication system (PCS) device, personal navigation device (PND), Personal Information Manager (PIM), Personal Digital Assistant (PDA), laptop, smartphone, tablet or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile station" or "target" are intended to include all devices, including wireless and wireline communication devices, computers, laptops, etc., which are capable of communication with a server, such as via the Internet, WiFi, cellular wireless network, Digital Subscriber Line (DSL) network, packet cable network or other network, and regardless of whether satellite signal reception, assistance data reception, and/or position-related processing occurs at the device, at a server, or at another device associated with the network. Any operable combination of the above are also considered a "mobile station."

Observed Time Difference of Arrival (OTDOA) is a position method defined by the 3rd Generation Partnership Project (3GPP) in 3GPP Technical Specification (TS) 36.355 and TS 36.211. OTDOA relies on measuring Reference Signal Time Differences (RSTDs) between downlink (DL) signals received from an evolved Node B (eNodeB) for a reference cell and eNodeB(s) for one or more neighbor cells. The DL signals for which RTSDs may be obtained comprise a Cell-specific Reference Signal (CRS) and a Positioning Reference Signal (PRS)—e.g. as defined in 3GPP TS 36.211.

OTDOA has a limitation due to the fact that it lacks an ability to provide a precise time of measurement. Instead, 3GPP TS 36.355 includes a reporting time interval (e.g. which may typically be set by a location server to around 16 seconds) within which OTDOA RSTD measurements must be made by an MS for a set of reference and neighbor cells. At the end of the reporting interval, only a single OTDOA RSTD measurement can be returned by the MS to a location server for each neighbor cell, even though measurements may be collected by the MS for any cell as often as every 160 ms over a positioning session. This may allow 100 alternative measurement occasions for each cell for an entire 16 second reporting interval. TOA measurements made for the cell at any time during the reporting interval, and TOA measurements made for other cells, may then all be projected to a common time, such as the one millisecond duration of one LTE subframe (e.g. at the midpoint of the reporting interval), before being converted to RSTD measurements and reported to a location server. The projection to a common point in time may be necessary to enable RSTD measurements between overlapping LTE subframes for the reference cell and each neighbor cell and may be based on an accurate external clock source, such as the DL signal frequency observed by the MS from the MS's serving cell. However, the projection may not compensate for any motion of the MS or any clock drift for the external clock source, which may be unknown to the MS. For example, if the MS changes its location during the reporting interval or if the external clock source is drifting, the projection of a TOA measurement for any cell to a common point in time may not accurately predict the TOA which the MS would have measured for that cell at the common point in time, thereby introducing an error into the projected TOA measurement. The error(s) introduced into the projected TOA measurement(s) may cause similar errors in the reported RSTD value(s) which may in turn cause an error in the resulting position fix.

Accordingly, to improve OTDOA positioning, an MS may include a time of measurement for each RSTD measurement reported to a location server. Providing the time of measurement may effectively function as "time tagging" or "time stamping" of each reported RSTD measurement. The time of measurement, for example, may indicate the actual time of measuring a TOA (that is used to determine an RSTD measurement) for any neighbor cell. The time of measurement may also or instead indicate an offset in terms of a number of PRS positioning occasions (or number of LTE subframes or number of LTE radio frames) indicating when a particular TOA measurement was made for a neighbor cell relative to a reporting reference time (also referred to herein as a common reference time), which could be the TOA measurement time for the reference cell. An MS may further report to a location server any common point in time to which TOA measurements made at other times were projected. A location server may use a time of measurement reported by an MS for each TOA measurement to compensate for any movement of the MS or any clock drift in an external (or internal) clock source for the MS during the reporting interval. For example, a location server could assume that the MS is moving in a straight line at a constant speed S in a direction D during the reporting interval and/or that an internal or external clock source is drifting at a constant rate R during the reporting interval. The location server can use these assumptions to infer more correct values for the RSTD measurements based on the known TOA measurements times and in terms of the unknown three additional variables (S, D and R in this example). If the MS reported RSTD measurements for many neighbor cells (e.g. 16 or more neighbor cells), the location server may be able to determine approximate values for these variables (S, D and R) as part of solving for the location coordinates of the UE (e.g. using multilateration). The location server can then use these approximate values to obtain a more accurate location for the MS.

In some implementations, an MS may report additional TOA measurements for any neighbor cell (or the reference cell) that were not used to obtain the RSTD measurement for the neighbor cell. These additional TOA measurements may be made for Positioning Reference Signal (PRS) correlation peaks for a measured neighbor cell that occur shortly (e.g. a few microseconds or less) before or after the TOA measurement used to obtain the RSTD measurement for the measured neighbor cell. For example, in some cases, an additional TOA measurement may correspond to receipt of a line of sight PRS signal from a measured neighbor cell which may provide a more accurate RSTD measurement for this neighbor cell. The additional TOA measurements may be provided by an MS for both the neighbor cells and the reference cell and may assist a location server to determine a more accurate location for the MS.

The additional TOA measurements for any neighbor cell (or the reference cell) may be specified using a time offset to the TOA measurement for the neighbor cell (or the reference cell) that was used to obtain a reported RSTD measurement for the neighbor cell (or a reported RSTD measurement for any neighbor cell in the case of additional TOA measurements for the reference cell). A location server may then determine an additional RSTD measurement for any neighbor cell from an additional TOA measurements for either the neighbor cell or the reference cell by using the reported RSTD measurement for the neighbor cell plus or minus the time offset of the additional TOA measurement. A location server may similarly infer the time of measurement for the additional TOA measurement using the time of measurement for the TOA measurement for the same cell that was used to derive the reported RSTD plus or minus the time offset of the additional TOA measurement.

Additionally, or alternatively, an MS may report two or more RSTD measurements for each neighbor cell. Multiple RSTD measurements may be reported for each of one or more neighbor cells by measuring multiple TOAs for each of the one or more neighbor cells and/or multiple TOAs for the reference cell. The multiple TOAs may be measured for each cell at almost the same time (e.g. by measuring more than one DL signal correlation peak for this cell) and/or may be measured at different times (e.g. at times that differ from one another by several seconds but that are within the reporting time interval). The multiple TOAs may be used to determine multiple RSTD measurements. For example, if only one TOA measurement T1 is obtained for the reference cell, an additional RSTD corresponding to an additional TOA measurement T2 for a neighbor cell may be determined from the difference T2−T1 after T1 and T2 have been projected to a common point in time. If a second TOA measurement T3 is obtained for the reference cell, a second RSTD for each additional TOA measurement T2 for a neighbor cell may be determined from the difference T2−T3 after T2 and T3 have been projected to a common point in time, although reporting this may be less efficient in signaling. The times of measurement for each of the additional TOA measurements may also be provided by an MS to a location server as discussed above.

Reporting additional TOA measurements and/or additional RSTD measurements to a location server by an MS, along with the time of measurement of each additional TOA measurement and/or each additional RSTD measurement as described above, may enable the location server to determine a more accurate location for the MS. For example, the location server may determine a set of most consistent RSTD (or TOA) measurements using just one RSTD (or TOA) measurement for each neighbor cell that enable a location for the MS to be determined with least uncertainty (or lowest error). The determination of a location for the MS with least uncertainty may also take into account a possible speed and direction for the MS during the reporting interval, and/or a clock drift for any external or internal source of time used by the MS to make and project TOA measurements, as discussed previously. For example, if a location server assumes that an MS has a constant speed S in a direction D during the reporting interval, the location server may solve for the MS X,Y coordinates at some time T during the reporting interval and for S and D using the multiple TOA and/or RSTD measurements and the measurement times to provide the additional data to solve for the additional variables.

FIG. 1 shows an architecture of a system 100 capable of providing Location Services (LCS) to an MS 120. The system 100 enables the transfer of location assistance data and/or location information, using messages such as Long Term Evolution (LTE) Positioning Protocol (LPP) or LPP Extensions (LPPe) messages between the MS 120 and a server 150, which, in some instances, may take the form of a location server or another network entity. The transfer of the location information may occur at a rate appropriate to both MS 120 and server 150. LPP is well-known and described in various publicly available technical specifications, such as 3GPP TS 36.355. LPPe has been defined by the Open Mobile Alliance (OMA) and may be used in combination with LPP such that an LPP message contains an embedded LPPe message, with the combined LPP and LPPe protocol being referred to as LPP/LPPe.

For simplicity, only one MS 120 and one server 150 are shown in FIG. 1. In general, system 100 may comprise multiple cells indicated by 145-$k$ (1≤k≤N$_{cells}$, where N$_{cells}$ is the number of cells), multiple networks 130, multiple LCS clients 160, multiple mobile stations 120, multiple servers 150, multiple (base station) antennas 140, and multiple Space Vehicles (SVs) 180. System 100 may comprise any number of cells including macrocells such as cells 145-1, 145-2, 145-3, and 145-4 in a manner consistent with embodiments disclosed herein.

MS 120 may be capable of wirelessly communicating with server 150 through one or more networks 130 that support positioning and location services. Support of location services may be provided by a number of location solutions that include but are not limited to the Secure User Plane Location (SUPL) location solution defined by OMA and the Control Plane location solution defined by 3GPP (e.g. in 3GPP TS 36.305) for use with an LTE serving network. For example, Location services (LCS) may be performed on behalf of LCS Client 160 that accesses server 150 (which may take the form of a location server) and issues a request for the location of MS 120. Server 150 may then respond to LCS client 160 with a location estimate for MS 120. LCS Client 160 may also be known as a SUPL Agent—e.g. when the location solution used by server 150 and MS 120 is SUPL. In some embodiments, MS 120 may also include an LCS Client or a SUPL agent (not shown in FIG. 1) that may issue a location request to some positioning capable function within MS 120 and later receive back a location estimate for MS 120. The LCS Client or SUPL Agent within MS 120 may perform location services for the user of MS 120—e.g. may provide navigation directions or identify points of interest within the vicinity of MS 120.

Server 150 as used herein may be a SUPL Location Platform (SLP), an Enhanced Serving Mobile Location Center (E-SMLC), a Serving Mobile Location Center (SMLC), a Gateway Mobile Location Center (GMLC), a Position Determining Entity (PDE), a Standalone SMLC (SAS), and/or the like.

As illustrated in FIG. 1, the MS 120 may communicate with server 150 through network 130 and one or more base station antennas 140, which may be associated with network 130. MS 120 may receive and measure signals (e.g. PRS signals) from antennas 140, which may be used for position determination. For example, MS 120 may receive and measure signals from one or more of antennas 140-1, 140-2, 140-3 and/or 140-4, which may be associated with cells 145-1, 145-2, 145-3 and 145-4, respectively. In some embodiments, antennas 140 may form part of a wireless communication network, which may be a wireless wide area network (WWAN), wireless local area network (WLAN), a wireless personal area network (WPAN), and so on. In some embodiments, one or more of antennas 140 may act as transmission points (TPs) or positioning beacons which transmit a downlink (DL) signal such as a positioning reference signal (PRS) but are not configured to receive uplink (UL) signals from an MS 120. In these embodiments, any cell 145 associated with a TP antenna 140 may represent a coverage area within which DL signals from the TP antenna 140 can be received and measured.

The term "network" and "system" are often used interchangeably. A network 130 that is a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMax network and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A network 130 that is a WLAN may be an IEEE 802.11× network, and a network 130 that is a WPAN may be a Bluetooth network, an IEEE 802.15× network, or some other type of network. The techniques described herein may also be implemented in conjunction with any combination of WWAN, WLAN and/or WPAN networks. For example, antennas 140 and network 130 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

MS 120 may also receive signals from one or more Earth orbiting Space Vehicles (SVs) 180-1 or 180-2 collectively referred to as SVs 180, which may be part of a satellite positioning system (SPS). SVs 180, for example, may be in a constellation of a Global Navigation Satellite System (GNSS) such as the US Global Positioning System (GPS), the European Galileo system, the Russian Glonass system or the Chinese BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2:
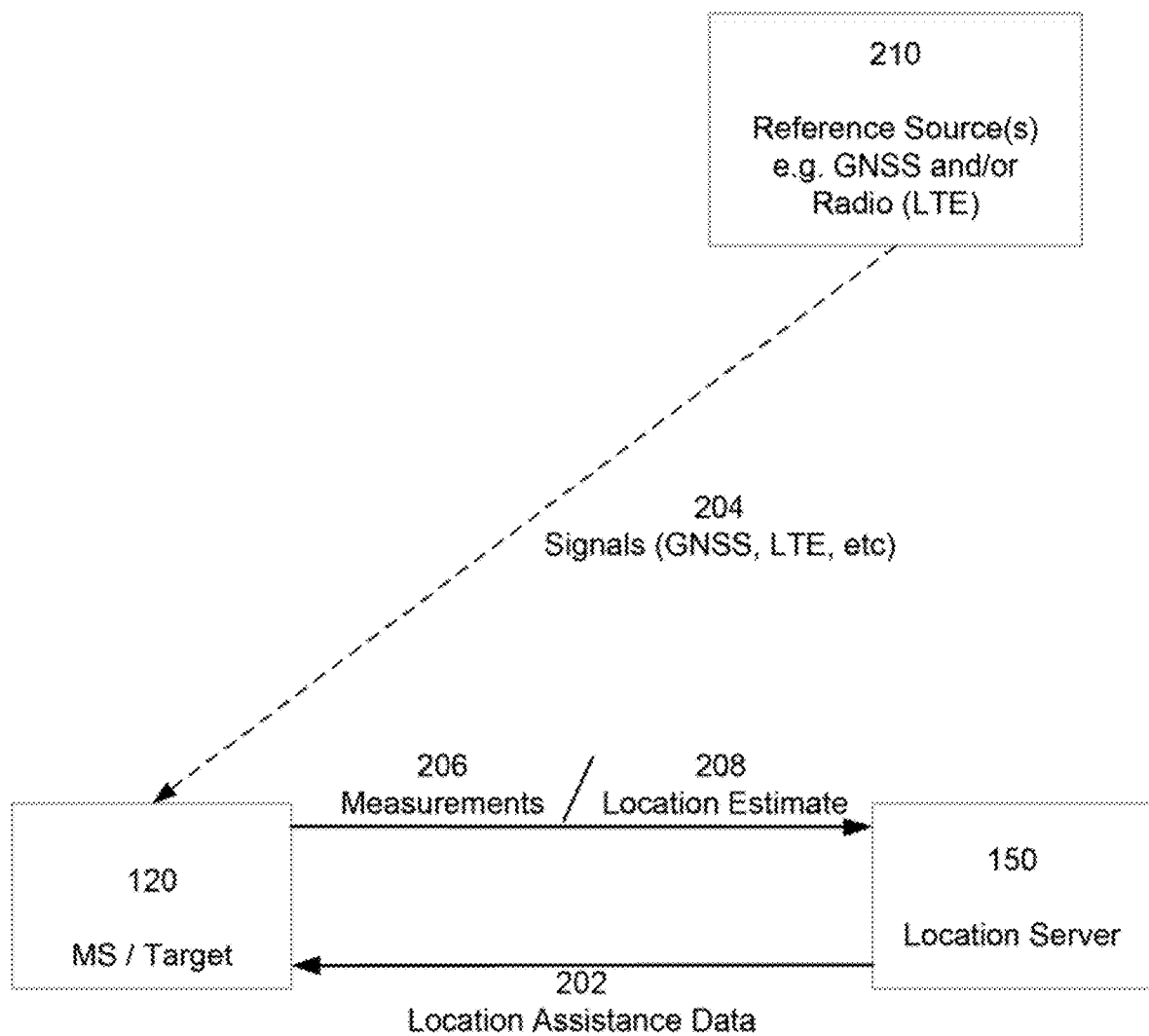
FIG. 2 shows a simplified block diagram illustrating some entities in a system capable of determining the location of a mobile station.

FIG. 2 shows a simplified block diagram illustrating some entities in a system 200 capable of determining the location of MS 120. Referring to FIG. 2, server 150 may provide location assistance data 202 to MS 120, which may be used to assist MS 120 in acquiring and measuring signals 204 from reference source(s) 210 (e.g. which may comprise SVs 180 and/or cell antennas 140), and/or in deriving or refining a location estimate 208 from measurements 206. Location assistance data 202 may include base station almanac (BSA) data for nearby antennas 140 such as cell identities, TP identities, DL PRS signal characteristics, transmission timing, antenna coordinates, and/or approximate expected RSTD measurements. Location assistance data 202 may also or instead include information for SVs 180 such as timing and ephemeris data. In some embodiments, MS 120 may take the form, e.g., of a Secure User Plane (SUPL) Enabled Terminal (SET), and may communicate with server 150 to provide an approximate location estimate 208 to server 150 (e.g. a current serving cell identity for MS 120) and in response receive location assistance data 202 applicable to the approximate location of MS 120. The MS 120 may use the location assistance data 202 to obtain measurements 206 from reference source(s) 210 (e.g. which may comprise SVs 180 and/or cell antennas 140), and may provide the measurements 206 to location server 150. The measurements 206 may comprise RSTD measurements in the case of reference sources 210 that include cell antennas 140 and/or may comprise GNSS pseudo-range or code phase values in the case of reference sources 210 that include SVs 180. The server 150 may then generate a location estimate for MS 120 based on the measurements 206, which may then be communicated to an LCS client 160 (not shown in FIG. 2) and/or to MS 120. In some embodiments (e.g. if assistance data 202 includes the locations of cell antennas 140 and/or precise orbital data for SVs 180), MS 120 rather than server 150 may determine a location estimate for MS 120 from the measurements 206. In this embodiment, MS 120 may send the determined location estimate to server 150 rather than the measurements 206.

MS 120 may measure signals from reference source(s) 210 to obtain measurements 206 and/or location estimate 208. Reference source(s) 210 may represent SVs 180 and/or antennas 140 associated with cells 145 in network 130. MS 120 may obtain measurements 206 by measuring pseudo-ranges for SVs 180 and/or OTDOA RSTDs from antennas 140. The OTDOA RSTD measurements may be based on the measured arrival times (e.g. TOA values) of downlink radio signals (e.g. PRS or CRS signals) from a plurality of base stations (such as eNodeBs) including one or more "neighbor cells" or "neighboring cells" relative to a "reference cell." For example, if a signal from a reference cell, such as cell 145-1 in FIG. 1, is received at time t1, and a signal from a neighbor cell, such as cell 145-3 in FIG. 1, is received at time t2, then the RSTD is given by t2−t1. Generally, t2 and t1 are known as Time Of Arrival (TOA) measurements. Typically, the measured TOA values will first be projected to a common point in time as discussed previously before the difference t2−t1 is obtained to determine an RSTD. The projection may add or subtract an integer number of LTE subframe intervals (of 1 millisecond each) in order for all the TOA measurements to refer to LTE subframes that are being transmitted in different cells at the same time or almost the same time. Specifically, the MS 120 can project the TOA measurement for each neighbor cell to refer to a TOA that would be expected to be measured by MS 120 for an LTE subframe for that neighbor cell that is observed by MS 120 to occur closest in time to some common LTE subframe for the reference cell. The integer number of LTE subframe intervals that are added or subtracted by MS 120 to perform the projection can be based on LTE subframe timing observed by MS 120 for the OTDOA reference cell or for the serving cell for MS 120 (if different to the reference cell). As described previously, the time interval indicated by these LTE subframe may not be precise due to movement by MS 120 during the interval of measurement and/or due to imprecision in the LTE subframe timing for the reference or serving cell.

In some instances, the OTDOA related measurements (such as RSTDs) obtained by MS 120 may be sent to server 150 to derive a position estimate for MS 120. The MS 120 may provide the RSTDs, including an identification of the reference cell and the neighbor cell for each RSTD measurement, to the server 150 as measurements 206. The location estimate 208 provided to the server 150 may be, e.g., a rough estimate of the position of the MS 120 or information from which a rough position of the MS 120 may be estimated, such as the cell ID of the cell serving MS 120 (the serving cell). In response, the server 150 may identify the reference cell (typically, the serving cell) and neighboring cells for the OTDOA RSTD measurements, and may provide location assistance data 202 to the MS 120 including reference cell information and neighbor cell information.

The OTDOA measurements (e.g., RSTD measurements) obtained by MS 120 may in principle be performed on any DL signals from base stations, such as cell-specific reference signals (CRS) or synchronization signals. For improved hearability, however, Positioning Reference Signals (PRS) transmitted by base stations may be preferred for OTDOA measurements. PRS signals, which are defined in 3GPP TS 36.211, are transmitted by a base station (eNodeB) in special positioning subframes that are grouped into positioning occasions.

As described previously, MS 120 may also include the TOA measurement times along with the RSTD values in measurements 206 sent to server 150. The TOA measurement times may refer to the actual time of measurement of a TOA prior to any projection to a common point in time. Thus, for example, if a signal from a reference cell, such as cell 145-1 in FIG. 1, is received at time t1, and a signal from a neighbor cell, such as cell 145-3 in FIG. 1, is received at time t2, then MS 120 may project t1 and t2 to a common point in time before obtaining the RSTD as the difference t2−t1, but may also provide the original measurement times for t1 and t2 along with the RSTD value. The original measurement times for t1 and t2 may be provided, for example, in terms of the number of 1 millisecond LTE subframe intervals that were added or subtracted to determine the projected values or in terms of a particular PRS positioning occasion that was measured by MS 120.

Figure 3A:
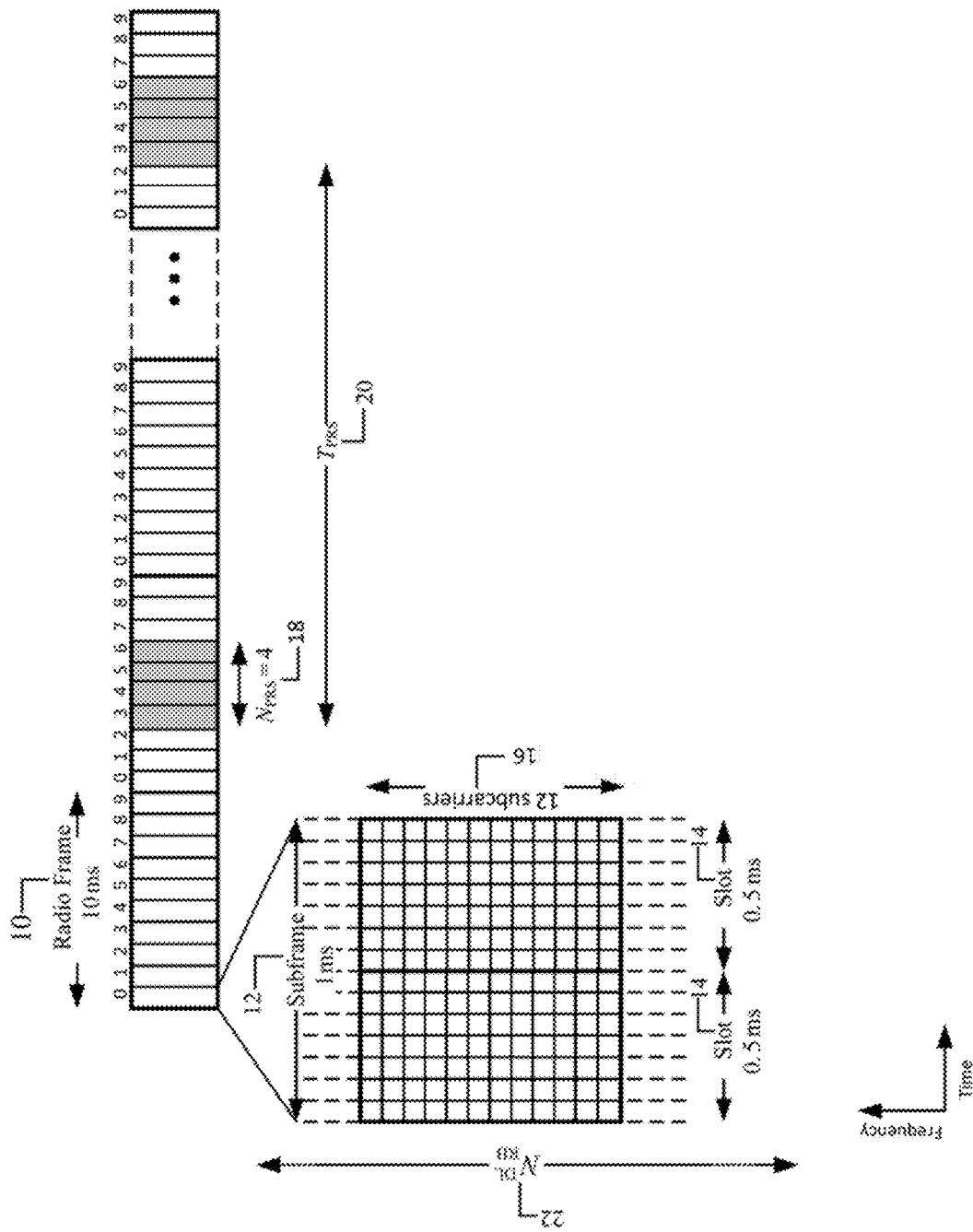
FIG. 3A shows the structure of an exemplary Long Term Evolution (LTE) frame with Positioning Reference Signals (PRS).

FIG. 3A shows the structure of an exemplary LTE frame sequence for any cell that supports LTE with PRS positioning occasions. In FIG. 3A, time is represented on the X (horizontal) axis, while frequency is represented on the Y (vertical) axis. As shown in FIG. 3A, downlink and uplink LTE Radio Frames 10 are of 10 ms duration each. For downlink Frequency Division Duplex (FDD) mode, Radio Frames 10 are organized into ten subframes 12 of 1 ms duration each. Each subframe 12 comprises two slots 14, each of 0.5 ms duration.

In the frequency domain, the available bandwidth may be divided into uniformly spaced orthogonal subcarriers 16. For example, for a normal length cyclic prefix using 15 KHz spacing, subcarriers 16 may be grouped into a group of 12 subcarriers. Each grouping, which comprises 12 subcarriers 16, in FIG. 3A, is termed a resource block and in the example above the number of subcarriers in the resource block may be written as $N_{30}^{SS}=12$. For a given channel bandwidth, the number of available resource blocks on each channel 22, which is also called the transmission bandwidth configuration 22, is given by $N_{38}^{0i}$ 22. For example, for a 3 MHz channel bandwidth in the above example, the number of available resource blocks on each channel 22 is given by $N_{SS}^{0i}=15$.

Referring to FIG. 1, in some embodiments, antennas 140-1 to 140-4 corresponding to cells 145-1 to 145-4, respectively, may transmit PRS signals. PRS signals are transmitted by a base station (e.g. eNodeB) in special positioning subframes that are grouped into positioning occasions (also referred to as PRS positioning occasions and PRS occasions). For example, in LTE, a positioning occasion can comprise a number, denoted as $N_{PRS}$, of between 1 and 160 consecutive positioning subframes and can occur periodically at intervals of 5, 10, 20, 40, 80, 160, 320, 640, or 1280 milliseconds. In the example shown in FIG. 3A, the number of consecutive positioning subframes 18 is 4 and may be written as $N_{PRS}=4$. The positioning occasions recur with PRS Periodicity 20. In FIG. 3A, PRS Periodicity 20 is denoted by $T_{PRS}$. In some embodiments, $T_{PRS}$ may be measured in terms of the number of subframes between the start of consecutive positioning occasions.

Within each positioning occasion, PRS may be transmitted with a constant power. PRS can also be transmitted with zero power (i.e., muted). Muting, which turns off a regularly scheduled PRS transmission, may be useful when PRS patterns between cells overlap. Muting aids signal acquisition by MS 120. Muting may be viewed as the non-transmission of a PRS for a given positioning occasion in a particular cell. Muting patterns may be signaled to MS 120 using bitstrings. For example, in a bitstring signaling a muting pattern, if a bit at position j is set to "0", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, PRS code sequence, etc., may be configured by network 130 and may be signaled to MS 120 (e.g., by server 150) as part of the OTDOA assistance data. For example, LPP or LPPe messages exchanged between MS 120 and server 150 may be used to transfer location assistance data 202 from server 150 to MS 120 including OTDOA assistance data. OTDOA assistance data may include reference cell information and neighbor cell information. The reference cell and neighbor cell information may each contain the PCIs of the cells as well as PRS configuration parameters for the cells.

The OTDOA assistance data may include "expected RSTD" parameters, which provide MS 120 with information about the approximate RSTD values MS 120 is expected to measure at its current location together with an uncertainty of the expected RSTD parameter. The expected RSTD together with the uncertainty defines then a search window for MS 120 where MS 120 is expected to measure the RSTD value. "Expected RSTDs" for cells included in the OTDOA assistance data neighbor cell information are usually provided relative to an OTDOA assistance data reference cell. OTDOA assistance data may also include PRS configuration information parameters, which allow MS 120 to determine approximately when a PRS positioning occasion occurs on signals received from various cells, and to determine the PRS sequence transmitted from various cells in order to measure a TOA.

Figure 3B:
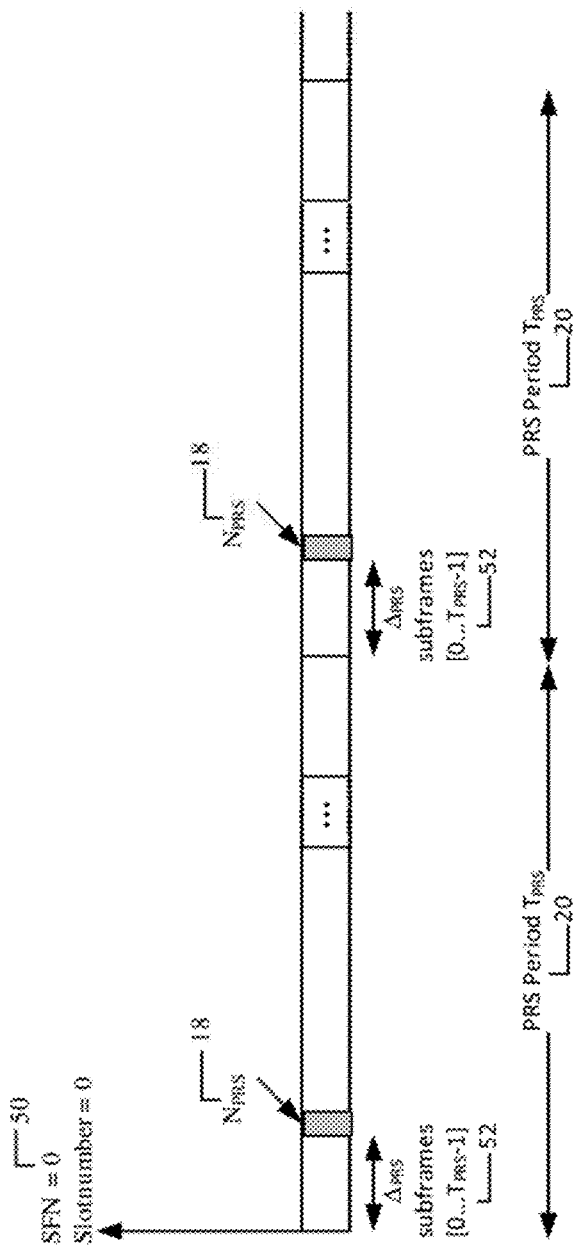
FIG. 3B illustrates the relationship between the System Frame Number (SFN), the cell specific subframe offset and the PRS Periodicity in an LTE frame.

FIG. 3B illustrates the relationship between the System Frame Number (SFN), the cell specific subframe offset ($\Delta_{PRS}$) and the PRS Periodicity 20. Typically, the cell specific PRS subframe configuration is defined by a "PRS Configuration Index" $I_{PRS}$ included in the OTDOA assistance data. The cell specific subframe configuration period and the cell specific subframe offset for the transmission of positioning reference signals are defined based on the $I_{PRS}$, in the 3GPP specifications listed in Table 1 below.

TABLE 1

Positioning reference signal subframe configuration

| PRS configuration index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the System Frame Number (SFN) of a cell that transmits PRS. PRS instances, for the first subframe of a PRS positioning occasion, satisfy $$(10 \times n_f + \lfloor n_s/2 \rfloor - \Delta_{PRS}) \bmod T_{PRS} = 0. \quad \text{eq. 1}$$

where, $n_f$ is the SFN with $0 \leq SFN \leq 1023$, $n_s$ is the slot number of the radio frame with $0 \leq n_s \leq 19$, $T_{PRS}$ is the PRS period, and $\Delta_{PRS}$ is the cell-specific subframe offset.

As shown in FIG. 3B, the cell specific subframe offset $\Delta_{PRS}$ 52 may be defined in terms of the number of subframes transmitted starting from System Frame Number 0, Slot Number 0 50 to the start of a PRS positioning occasion. In FIG. 3B, the number of consecutive positioning subframes 18, $N_{PRS}$=4.

In some embodiments, when MS 120 receives a PRS configuration index $I_{PRS}$ in the OTDOA assistance data, MS 120 may determine PRS periodicity $T_{PRS}$ and PRS subframe offset $\Delta_{PRS}$ using Table 1. Upon obtaining information about the frame and slot timing i.e., the SFN and slot number ($n_f$, $n_s$) for cell 145-*k*, MS 120 may determine the frame and slot when a PRS is scheduled in cell 145-*k*.

The OTDOA assistance data is determined by location server 150 and includes assistance data for a reference cell, and a number of neighbor cells. Additionally, in a request for location information (e.g. a request for OTDOA RSTD measurements) sent by server 150 to MS 120, the location server 150 typically specifies a response time, which defines some reporting time interval (e.g. 16 seconds long) within which measurements must be made by the MS 120 for a set of cells. During the reporting interval (also referred to herein as a reporting time interval or response time), the MS 120 may collect measurements from each cell during one or more positioning occasions for that cell, which may occur with a frequency of, e.g., 160 ms. Accordingly, the MS 120 may collect approximately 100 measurements for different cells during a 16 second reporting time interval if positioning occasions for each cell have a periodicity of 160 milliseconds. Conventionally, however, at the end of the response time, the MS 120 returns only a single RSTD (OTDOA) measurement for each cell, even though more than one TOA measurement may have been obtained for that cell during the reporting interval.

As discussed previously, the RSTD measurement is based on a measured TOA from a neighbor cell with respect to the measured TOA from the reference cell. The measurements from the neighbor cell and the reference cell to be used in the single RSTD measurement may each be selected based on the best measurement, e.g., the best measurement from the neighbor cell and the best measurement from the reference cell within the positioning session. Here, "best measurement" may refer to measurement of a PRS signal with greatest signal strength or signal quality as indicated by a coherent signal integration result with highest signal strength and/or lowest TOA uncertainty. The measured TOA t1 from the reference cell, however, may be measured at a significantly different time than the measured TOA t2 from the neighbor cell, e.g., one may be measured at the beginning of a 16 second reporting interval while the other may be measured at the end of the 16 time interval. The two measurements from different parts of the reporting interval may be projected to almost the same point in time, as described previously, before reporting the RSTD, given by t2−t1. Conventionally, the MS 120 provides a time stamp for the most recent neighbor cell RSTD measurement in the form of the SFN (System Frame Number) for the reference cell at which this RSTD measurement occurred. For example, this may indicate the time of the most recent neighbor cell TOA measurement. However, conventionally, the MS 120 does not report when the reference cell TOA measurement(s) and the other neighbor cell TOA measurement(s) occurred during the reporting interval. For example, the SFN may be considered a clock tick that increments every 10 ms, so the reported SFN represents one point in time, while a reporting interval represents a time duration. Consequently, any information related to user motion or clock drift is not present in conventional OTDOA, which may appear as error sources in the resulting position. Thus, conventional OTDOA suffers from a limitation due to the fact that it lacks a notion of time of measurement.

Therefore, the MS 120 may report to the location server 150 an RSTD measurement along with a measurement time or indication of the time epoch within the reporting interval at which the reference cell measurement(s) (e.g. reference cell TOA measurement(s)) and each of the neighbor cell measurements (e.g. neighbor cell TOA measurements) were obtained by MS 120. For example, the measurement time may be indicated by a number, e.g., between 1 and 100, that defines a time relative to a common reference time (e.g. a common known reference time) such as the OTDOA reporting SFN reference time that is provided by MS 120 for conventional OTDOA. The measurement time may be a number that is aligned with the positioning occasions, radio frames or subframes for the measured cell. For example, the measurement time may provide the number of subframes, number of radio frames or number of PRS positioning occasions for the measured cell that occur in the interval of time between the actual measurement (e.g. for a TOA) and the common reference time. The measurement time may further indicate a positive or negative offset in number of positioning occasions, number of radio frames or number of subframes that indicate when a particular measurement was made relative to the common reference time.

The MS 120 may also specify a measurement time (e.g. for a neighbor cell or reference cell TOA measurement) using an absolute time such as GPS time, another GNSS time or Coordinated Universal Time (UTC) if the MS 120 is aware of GPS, GNSS or UTC time. For example, MS 120 may be aware of GPS, GNSS or UTC time from measurements of SVs 180 and/or from broadcast of GPS, GNSS or UTC time by network 130. The MS 120 may alternatively or in addition specify a measurement time by providing an SFN for the radio frame for the measured cell, the reference cell (e.g. if not the measured cell) or for the serving cell (e.g. if not the reference cell) that was received (or was being received) by the MS 120 at the measurement time. Since the SFN for each LTE cell wraps around every 10.24 seconds, the MS may further provide a hyper-SFN number or a count of the number of SFN wraparound occasions as part of the measurement time. For example, if a radio frame with SFN 600 is received by MS 120 for the reference cell when a particular TOA measurement is obtained for a neighbor cell and a radio frame with SFN 800 is received by MS 120 for the reference cell at the common reference time that occurs later than the measurement time after the SFN for the reference cell has wrapped around once, the MS 120 may provide the SFN 600 and an indication of one SFN wraparound occasion. Alternatively, in this example, the MS 120 may provide the total number of radio frames that occur during this period which would equal 1024+(800−600)=1224 radio frames which would be equal to 12.24 seconds. The MS 120 may also include any uncertainty for the measurement time—e.g. an uncertainty for an absolute GPS time or for a time duration expressed in subframes, radio frames or positioning occasions.

The server 150 may have knowledge of the source (e.g. GPS) of the time reference for the cell network, and the server 150 could have good local knowledge of the same time source e.g. through NTP (Network Time Protocol). With this knowledge, and with knowledge of the time when a message was sent to the MS 120 and when the response message was received from the MS 120, the server 150 may resolve time-of-measurement on an absolute scale. The time-of-measurements of the neighbor cells could be reported using an offset in number of positioning occasions or number of subframes from the reference occasion. This offset could be positive, zero, or negative. In cases where all cells in the assistance data (AD) had the same $I_{PRS}$, with no sub-frame or slot offsets, the reported occasion offset could be represented as a simple integer. If there were a multitude of $I_{PRS}$ and/or symbol-offset and/or slot-offset combinations in the AD, the occasion offset could be reported in 0.5 ms resolution (slot duration). Alternatively, a mathematical floor function could be used to reduce precision to integer occasion resolution. This would reduce the upload data size, but would require the server 150 to calculate corrections based on its knowledge of $I_{PRS}$ sub-frame offsets and slot offsets.

In one embodiment, the MS 120 may use the reference cell to provide both a reporting reference time (as for conventional OTDOA) and the time of measurement for each neighbor cell. The reporting reference time may be aligned (e.g. set equal to) a time of measurement for the reference cell and provided to the server 150 as the reference cell SFN and possibly accompanied by the subframe number for one positioning occasion (e.g. the last positioning occasion) measured by MS 120 for the reference cell. If MS 120 has absolute time (e.g. GPS time) available, the reporting reference time may also be provided to server 150 using an absolute time. The reporting reference time may be the same as the common reference time referred to herein earlier, allowing the time of measurement for one or more TOA measurements to be reported relative to the reporting reference time as described earlier. The time of measurement of a TOA measurement for each neighbor cell may be reported by MS 120 to the server 150 by providing the reference cell SFN and possibly the reference cell subframe number during which the first (or last) subframe for the first (or last) positioning occasion for the neighbor cell was measured. To allow for SFN wraparound every 10.24 seconds, the time of TOA measurement for a neighbor cell may also include a count of the number of times the reference cell SFN wrapped around—e.g. as a negative value if the neighbor cell TOA measurement time occurred before the reporting reference time and a positive value if this occurred subsequently. The MS 120 may also include an approximate time interval (e.g. expressed in seconds) between the reporting reference time and the time of receiving a request from server 150 to provide OTDOA RSTD measurements.

The MS 120 may additionally or alternatively report more than one RSTD to the location server 150 for each of one or more neighbor cells. The MS 120 may generate two or more RSTDs for a neighbor cell using the plurality of TOA measurements obtained for this neighbor cell during the reporting interval, and may report the two or more RSTDs to the location server. The MS 120 may additionally report to the location server 150 a measurement time or indication of the time epoch within the reporting interval that is associated with each of the RSTDs and/or that is associated with the TOA measurements used to obtain each of the two or more RSTDs. For example, the MS 120 may report an indication of the time offset in number of positioning occasions (or number of radio frames or number of subframes) indicating when a particular TOA measurement for each of the two or more RSTDs for a neighbor cell was obtained relative to the reporting reference time. The MS 120 may further report an indication of the TOA measurement time(s) for the reference cell that were used to obtain each of two or more RSTDs for a neighbor cell. Thus, the time separation between the reference cell TOA and neighbor cell TOA for each RSTD may be reported and the time epoch within the positioning session for each RSTD may be reported. In one implementation, rather than reporting RSTDs with associated time stamps, the MS 120 may report to the location server 150 two or more TOAs for each cell, along with an associated measurement time, and the location server 150 may generate the RSTDs.

With multiple measurements reported for one or more cells by the MS 120, the location server 150 may estimate user motion and/or clock drift, thereby improving the overall positioning accuracy. For example, the location server 150 may determine a velocity V and a horizontal bearing (or direction) A for MS 120 from the RSTD measurements and the indication of the measurement time reported by MS 120 for each RSTD measurement. The location server 150 may solve for the MS 120 position X,Y coordinates at a time T and for V and A using the multiple measurements to provide the additional data to solve for the additional variables. For example, if RSTD measurements are from significantly different time epochs of the reporting interval, e.g., the beginning and the end of a 16 second reporting interval, a final position determination made with these RSTD measurements may have a relatively large uncertainty as the MS 120 may have moved a considerable distance within the 16 seconds. Moreover, multiple position determinations may be generated by location server 150 using different sets of RSTDs that were acquired by MS 120 close in time during the reporting interval. For example, a first set of RSTDs from near the beginning of the reporting interval may produce a first position estimate for MS 120 and a second set of RSTDs from near the end of the reporting interval may produce a second position estimate for MS 120 that is different to the first position estimate due to movement by MS 120 during the reporting interval. The first and second position estimates may be used to estimate the velocity V and direction A of the MS 120.

FIG. 4 shows a flowchart for an exemplary method 400 for performing Observed Time Difference of Arrival (OTDOA) positioning at MS 120 in a manner consistent with disclosed embodiments.

In some embodiments, in step 410, the MS 120 performs a plurality of time of arrival (TOA) measurements of downlink (DL) signals transmitted from a reference cell and a neighbor cell. The plurality of TOA measurements may be performed by measuring the time of arrival of one or more positioning occasions (e.g. PRS positioning occasions) for each of the reference cell and neighbor cell.

In step 420, the MS 120 generates a first Reference Signal Time Difference (RSTD) using a first TOA measurement of a first DL signal from the reference cell and a second TOA measurement of a second DL signal from the neighbor cell. For example, the first and the second TOA measurements may be projected to a common point in time and the RSTD may be obtained as the difference between the projected first TOA measurement and the projected second TOA measurement.

In step 430, the MS 120 reports location information to a location server (e.g. location server 150) for OTDOA positioning of the mobile station, wherein the location information comprises the first RSTD and at least one measurement time, wherein the at least one measurement time is based on a time of measurement for the first TOA measurement and a time of measurement for the second TOA measurement. For example, the location information may be reported to the location server for OTDOA positioning of the mobile station using the Long Term Evolution (LTE) Positioning Protocol (LPP) defined by 3GPP.

The at least one measurement time based on a time of measurement for the first TOA measurement and a time of measurement for the second TOA measurement may be provided as a relative or absolute time for each TOA measurement or as a relative time difference between the TOA measurements. For example, the at least one measurement time may be the time of measurement for the second TOA measurement relative to the time of measurement for the first TOA measurement. The at least one measurement time may be the time of measurement for the first TOA measurement and the time of measurement for the second TOA measurement. For example, the time of measurement for the first TOA measurement and the time of measurement for the second TOA measurement may be relative to a common reference time. Further, the time of measurement for the first TOA measurement and the time of measurement for the second TOA measurement may each be the original time of measurement by MS 120 (e.g. without any projection to a common point in time).

The downlink signals may be a positioning reference signal (PRS) for Long Term Evolution (LTE) and/or a Cell-specific Reference Signal (CRS) for LTE. For example, the at least one measurement time may include units of PRS positioning occasions, units of LTE radio frames, units of LTE subframes, a count of system frame number wrap-around occasions, a Global Positioning System (GPS) time, a Global Navigation Satellite System (GNSS) time, a Coordinated Universal Time (UTC), or some combination thereof.

In one implementation, the location information may further include at least one additional TOA measurement for at least one of the reference cell and the neighbor cell and a time of measurement for the least one additional TOA measurement.

In one implementation, the method may further include performing a plurality of TOA measurements of DL signals from a second neighbor cell; and generating a second RSTD using the first TOA measurement of the first DL signal from the reference cell and a third TOA measurement of a third DL signal from the second neighbor cell. The location information may further comprise the second RSTD and an indication of a time of measurement for the third TOA measurement.

FIG. 5 shows a flowchart for an exemplary method 500 for performing Observed Time Difference of Arrival (OTDOA) positioning with location server 150 in a manner consistent with disclosed embodiments.

In one implementation, in step 510 the location server 150 receives location information from a mobile station (e.g. the MS 120) for OTDOA positioning of the mobile station, the location information comprising a Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement. For example, the location information may be reported using the Long Term Evolution (LTE) Positioning Protocol (LPP). In step 520, the location server 150 uses the location information to determine a location of the mobile station.

The at least one measurement time based on a time of measurement for the first TOA measurement and a time of measurement for the second TOA measurement may be provided as relative or absolute times for each TOA measurement or as a relative time difference between the TOA measurements. For example, the at least one measurement time may be the time of measurement for the second TOA measurement relative to the time of measurement for the first TOA measurement. The at least one measurement time may be the time of measurement for the first TOA measurement and the time of measurement for the second TOA measurement. For example, the time of measurement for the first TOA measurement and the time of measurement for the second TOA measurement may be relative to a common reference time.

The downlink signals may be a positioning reference signal (PRS) for Long Term Evolution (LTE) and/or a Cell-specific Reference Signal (CRS) for LTE. For example, the at least one measurement time may include units of PRS positioning occasions, units of LTE radio frames, units of LTE subframes, a count of system frame number wrap-around occasions, a Global Positioning System (GPS) time, a Global Navigation Satellite System (GNSS) time, a Coordinated Universal Time (UTC), or some combination thereof.

In one implementation, the location information may further include at least one additional TOA measurement for at least one of the reference cell and the neighbor cell and a time of measurement for the least one additional TOA measurement.

In one implementation, the location information may further comprise a second RSTD generated by the mobile station using the first TOA measurement of the first DL signal from the reference cell and a third TOA measurement of a third DL signal from a second neighbor cell, the location information further comprising an indication of a time of measurement for the third TOA.

The location information for OTDOA based positioning determination may be used by using the RSTD, along with other position information, such as additional RSTDs for additional neighbor cells, to determine a position estimate for the mobile station. The at least one measurement time based on a time of measurement for the first TOA measurement and a time of measurement for the second TOA measurement may be used by the location server to estimate an uncertainty in the RSTD, a velocity of the mobile station, and/or the position estimate.

For example, if the TOA measurement from the reference cell is from a significantly different time during the positioning session than the TOA measurement from the neighbor cell, the mobile station may have moved between measurements and, accordingly, the uncertainty of the resulting RSTD and/or the position estimated based on the RSTD may be increased appropriately. For example, if the user speed is known or can be inferred, the measurement uncertainty may be increased by the product of the speed estimate and the time elapsed. Otherwise, the measurement uncertainty may be inflated using a fixed speed uncertainty multiplied by the time elapsed. Conversely, if the TOA measurement from the reference cell is from approximately the same time as the TOA measurement from the neighbor cell, there may be little or no movement of the mobile station between measurements and, accordingly, the uncertainty of the resulting RSTD and/or the position estimated based on the RSTD may be decreased.

Additionally, the at least one measurement time based on a time of measurement for the first TOA measurement and a time of measurement for the second TOA measurement may be used to determine motion of the mobile station, which can be used to improve a position estimate of the mobile station. For example, the location server may use the RSTD and the at least one measurement time to determine velocity and direction of the mobile station during the positioning session. For example, the motion may be velocity and direction of travel of the mobile station during the positioning session. In one implementation, the motion may include velocity and the location server may adjust uncertainty in the OTDOA based position determination of the mobile station based on the velocity. By way of example, a number of RSTDs from geographically diverse cells may be collected at different points in time. Each of the measurement sets may be used to produce individual position fixes. The difference vector(s) between these position fixes and the time delta could then be used to calculate the corresponding velocity vector(s) between the two position fixes.

Figure 6:
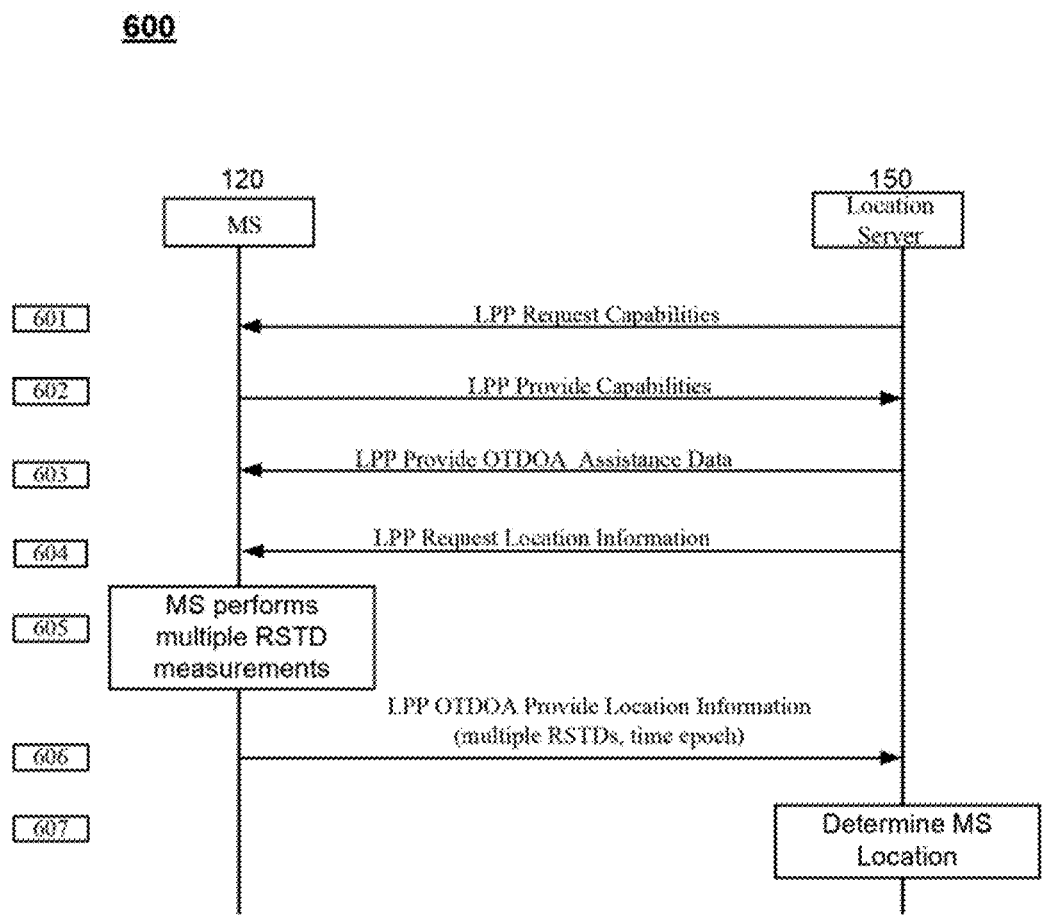
FIG. 6 illustrates exemplary message flow of a procedure that supports OTDOA position determination in a manner consistent with disclosed embodiments.

FIG. 6 illustrates an exemplary message flow 600 of a procedure that supports OTDOA position determination in which the MS 120 provides an indication of a time epoch for each of one or more RSTD measurements.

At step 601, location server 150, which may take the form of an Enhanced Serving Mobile Location Centre (E-SMLC) or a SUPL SLP, may transmit to the MS 120 a Request Capabilities message (e.g. an LPP Request Capabilities message) to request the positioning capabilities of MS 120 such as the OTDOA positioning capabilities of MS 120. In response, at step 602, the MS 102 sends a Provide Capabilities message (e.g. an LPP Provide Capabilities message) to the location server 150 to provide the positioning capabilities of MS 120. If OTDOA positioning capabilities were requested in step 601, the Provide Capabilities message may include the OTDOA positioning capabilities of MS 120 such as the OTDOA modes supported by MS 120 (e.g. MS assisted OTDOA and/or MS based OTDOA), supported frequency bands, and support for inter-frequency RSTD measurements.

At step 603, the location server 150 may send a Provide Assistance Data message (e.g. an LPP Provide Assistance Data message) to the MS 120 with OTDOA assistance data. The OTDOA assistance data may include assistance data for the reference cell and assistance data for a number of neighbor cells. For example, the assistance data may include configuration parameters defining PRS signals transmitted by the reference cell and each neighbor cell. At step 604, the location server 150 sends a Request Location Information message (e.g. an LPP Request Location Information message) to the MS 120 to request RSTD measurements for OTDOA positioning. This message may include information elements such as the location information type required (e.g. indicating measurements or a location estimate), a desired accuracy of a location estimate, and a response time interval (also referred to herein as a reporting time interval).

At step 605, the MS 120 performs the RSTD measurements using the provided assistance data. As discussed previously, the MS 120 may perform multiple TOA measurements per cell during the response time interval and may generate one or more TOA measurements for the reference cell and one or more RSTD measurements and/or one or more TOA measurements for each neighbor cell, each possibly at a different time period within the response time interval.

At step 606, and at or before the response time interval has expired, the MS 120 sends one or more RSTD measurements for each of for one or more neighbor cells in a Provide Location Information message (e.g. an LPP Provide Location Information message) to the location server 150, including an indication of the measurement time (also referred to herein as a time of measurement) of each RSTD measurement. The measurement time for an RSTD measurement for each neighbor cell may be the measurement time for a TOA measurement for the neighbor cell that was used to determine the RSTD measurement. The Provide Location Information message may further include other information elements, such as a time stamp for the most recent RSTD measurement (e.g. in the form of the System Frame Number (SFN) for the reference cell), an identity of the reference cell used for determining the RSTDs, a quality of the TOA measurement from the reference cell, a neighboring cell measurement list, an identity of each of the measured neighbor cells, the quality of each of the RSTD measurements. The MS 120 may further include in the Provide Location Information message: (i) a measurement time for a TOA measurement for the reference cell that was used to determine the RSTD measurements; (ii) one or more TOA measurements for the reference cell; (iii) one or more TOA measurements for each of one or more neighbor cells; and/or (iv) a measurement time for each TOA measurement in (ii) and/or (iii). The measurement times included in the Provide Location Information message may be specified relative to a common reference time. The common reference time may be indicated using a timestamp (e.g. a reference cell SFN) for the most recent RSTD measurement, an indication of the start of the response time interval or the time of a TOA measurement for the reference cell (e.g. the TOA measurement for the reference cell that was used to determine each of the provided RSTD measurements). A measurement time that is specified relative to another time may further be specified in terms of (e.g. may include units of) PRS positioning occasions, LTE radio frames, LTE subframes and/or a count of the number of SFN wrap around occasions for either the cell to which the measurement time refers or the reference cell. Any measurement time included in the Provide Location Information message may further be specified as an absolute time (e.g. a GPS time, GNSS time or UTC).

At step 607, the location server 150 uses the RSTD measurements, any TOA measurements and the measurement times provided by the MS 120 at step 606 to determine the location of MS 120. For example, the location server 150 may use the known locations of the antennas (e.g. antennas 140) for the cells (e.g. cells 145) measured by the MS 120 at step 605 as well as the measurement information received in step 606 to determine the location. As part of the location determination, the location server 150 may use the measurement times to determine a velocity and direction for the MS 120 (or determine that the MS 120 was stationary during the response time interval) and/or a clock drift for an internal or external clock source used by the MS 120 to obtain RSTD and TOA measurements, as described previously. The determination of a velocity and direction for the MS 120 and/or a clock drift for an internal or external clock source may enable a more accurate location determination by location server 150 for MS 120.

Figure 7:
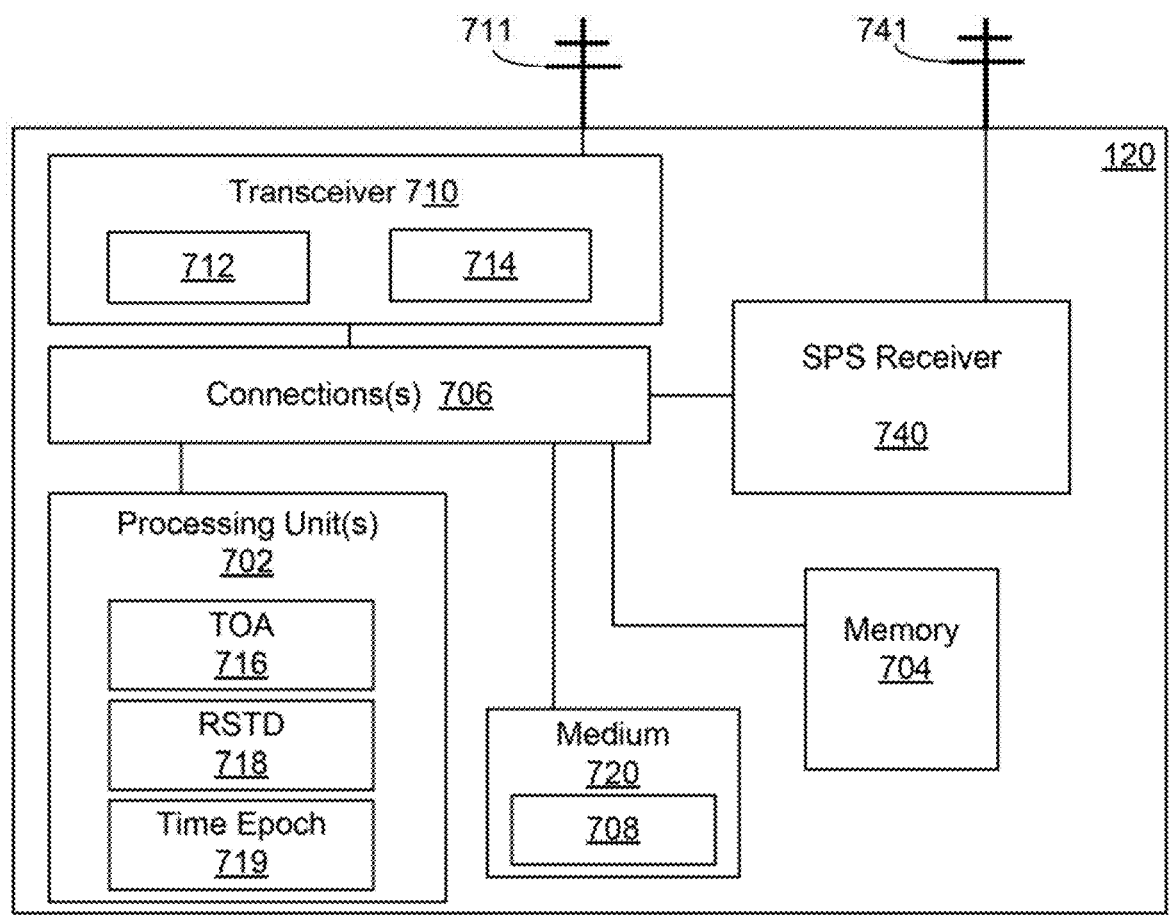
FIG. 7 shows a schematic block diagram illustrating certain exemplary features of a mobile station enabled to perform OTDOA position determination in a manner consistent with disclosed embodiments.

FIG. 7 shows a schematic block diagram illustrating certain exemplary features of MS 120 enabled to support OTDOA measurements with an indication of time epoch within the response time interval associated with the measurements in a manner consistent with disclosed embodiments. MS 120 may, for example, include one or more processing units 702, memory 704, a transceiver 710 (e.g., wireless network interface), and (as applicable) an SPS receiver 740, which may be operatively coupled with one or more connections 706 (e.g., buses, lines, fibers, links, etc.) to non-transitory computer-readable medium 720 and memory 704. In certain example implementations, all or part of MS 120 may take the form of a chipset, and/or the like. The SPS receiver 740 may be enabled to receive signals associated with one or more SPS resources. Transceiver 710 may, for example, include a transmitter 712 enabled to transmit one or more signals over one or more types of wireless communication networks and a receiver 714 to receive one or more signals transmitted over the one or more types of wireless communication networks.

Processing unit 702 may be implemented using a combination of hardware, firmware, and software. For example, processing unit 702 may be configured to perform the functions discussed herein by implementing one or more instructions or program code 708 on a non-transitory computer-readable medium, such as medium 720 and/or memory 704. In some embodiments, processing unit 702 may represent one or more circuits configurable to perform at least a portion of a data signal computing procedure or process related to the operation of MS 120. For example, in some embodiments, processing unit 702 may be configured to include a TOA 716 module with which a plurality of time of arrival (TOA) measurements of signals from the reference cell and one or more neighbor cells are measuring during the requested positioning session. An RSTD 718 module generates one or more RSTD measurements for each of the neighbor cells with respect to the reference cell. The Time Epoch 719 module determines an indication of the time epoch during the response time interval that is associated with each of the determined RSTD measurements. The MS 120 reports the RSTD measurements from the RSTD 718 module and the associated time epochs from the Time Epoch 719 module to a location server via transmitter 712.

In some embodiments, MS 120 may include antennas 711 and 741, which may be internal or external. MS antennas 711 and 741 may be used to transmit and/or receive signals processed by transceiver 710 and SPS receiver 740, respectively. In some embodiments, MS antennas 711, and 741 may be coupled to transceiver 710 and SPS receiver 740. In some embodiments, measurements of signals received (transmitted) by MS 120 may be performed at the point of connection of the MS antenna 711 and transceiver 710. For example, the measurement point of reference for received (transmitted) RF signal measurements may be an input (output) terminal of the receiver 714 (transmitter 712) and an output (input) terminal of the MS antennas 711. In an MS 120 with multiple MS antennas 711 or antenna arrays, the antenna connector may be viewed as a virtual point representing the aggregate output (input) of multiple MS antennas. In some embodiments, MS 120 may measure received signals including signal strength and TOA measurements and the raw measurements may be processed by processing units 702. In some embodiments, the antennas 711 and 741 may be combined.

The methodologies described herein may be implemented by various means depending upon the application. For example, these methodologies may be implemented in hardware, firmware, software, or any combination thereof. For a hardware implementation, the processing unit 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 720 or memory 704 that is connected to and executed by processing unit 702. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer-readable medium, such as medium 720 and/or memory 704. Examples include computer-readable media encoded with a data structure and computer-readable media encoded with a computer program 708. For example, the non-transitory computer-readable medium including program code 708 stored thereon may include program code 708 to support OTDOA measurements in a manner consistent with disclosed embodiments. Non-transitory computer-readable media 720 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from processing unit 702, it should be understood that all or part of a primary memory may be provided within or otherwise co-located/coupled with processing unit 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 720. As such, in certain example implementations, the methods and/or apparatuses presented herein may take the form in whole or part of a computer-readable medium 720 that may include computer implementable instructions 708 stored thereon, which if executed by at least one processing unit 702 may be operatively enabled to perform all or portions of the example operations as described herein. Computer readable medium 720 may be a part of memory 704.

In certain implementations, a mobile station for performing Observed Time Difference of Arrival (OTDOA) may include a means for performing a plurality of time of arrival (TOA) measurements of downlink (DL) signals transmitted from a reference cell and a neighbor cell, which may be, e.g., the transceiver 710 or the receiver 714 in particular, and the TOA 716 module implemented in processing unit 702. A means for generating a first Reference Signal Time Difference (RSTD) using a first TOA measurement of a first DL signal from the reference cell and a second TOA measurement of a second DL signal from the neighbor cell may be, e.g., the RSTD 718 module implemented in the processing unit 702. A means for reporting location information to a location server for OTDOA positioning of the mobile station, wherein the location information comprises the first RSTD and at least one measurement time, wherein the at least one measurement time is based on a time of measurement for the first TOA measurement and a time of measurement for the second TOA measurement, may be, e.g., the time epoch 719 module implemented in the processing unit 702 and the transceiver 710 or the transmitter 712 in particular. In some implementations, the mobile station may further include a means for performing a plurality of TOA measurements of DL signals from a second neighbor cell, which may be, e.g., the transceiver 710 or the receiver 714 in particular, and the TOA 716 module implemented in processing unit 702. A means for generating a second RSTD using the first TOA measurement of the first DL signal from the reference cell and a third TOA measurement of a third DL signal from the second neighbor cell may be e.g., the RSTD 718 module implemented in the processing unit 702.

Figure 8:
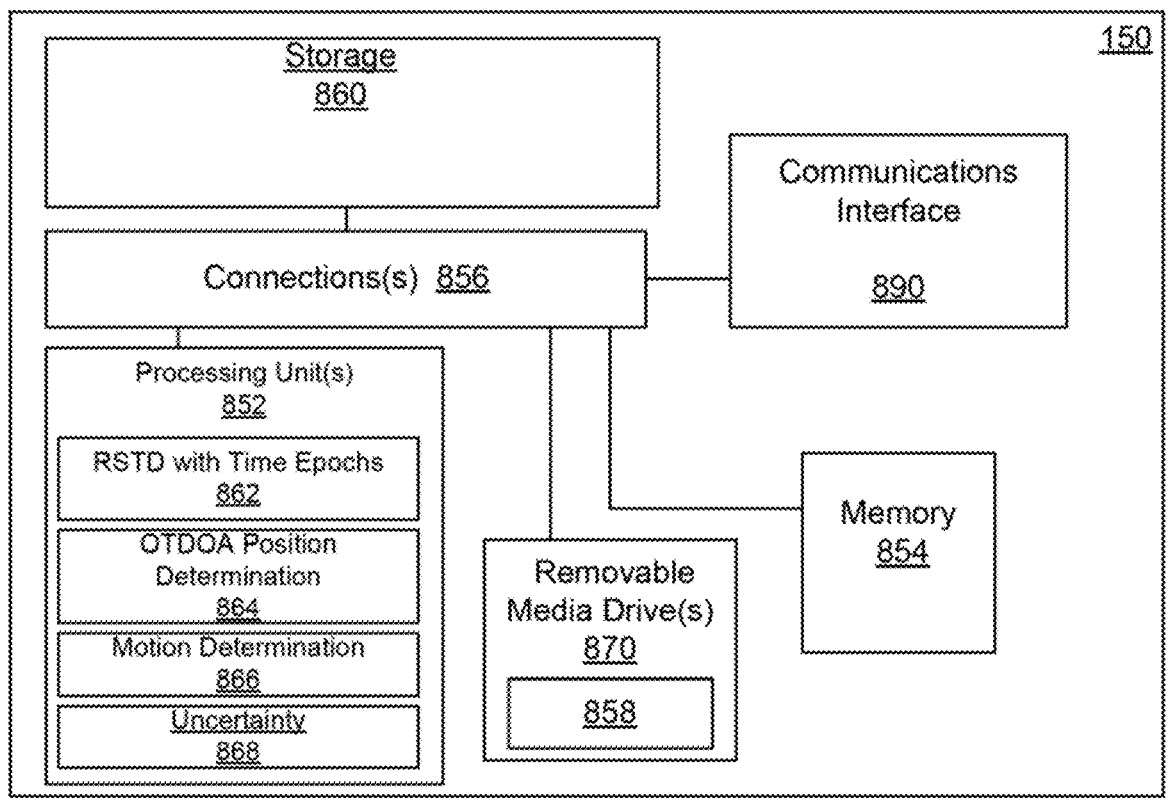
FIG. 8 shows a schematic block diagram illustrating a server enabled to perform OTDOA position determination for a mobile station in a manner consistent with disclosed embodiments.

FIG. 8 is a schematic block diagram illustrating a server 150 enabled to enabled to support OTDOA measurements with an indication of time epoch within the response time interval associated with the measurements in a manner consistent with disclosed embodiments. In some embodiments, server 150 may perform functions of location server 150, an E-SMLC and/or a SUPL SLP. In some embodiments, server 150 may include, for example, one or more processing units 852, memory 854, storage 860, and (as applicable) communications interface 890 (e.g., wireline or wireless network interface), which may be operatively coupled with one or more connections 856 (e.g., buses, lines, fibers, links, etc.). In certain example implementations, some portion of server 150 may take the form of a chipset, and/or the like.

Communications interface 890 may include a variety of wired and wireless connections that support wired transmission and/or reception and, if desired, may additionally or alternatively support transmission and reception of one or more signals over one or more types of wireless communication networks. Communications interface 890 may also include interfaces for communication with various other computers and peripherals. For example, in one embodiment, communications interface 890 may comprise network interface cards, input-output cards, chips and/or ASICs that implement one or more of the communication functions performed by server 150. In some embodiments, communications interface 890 may also interface with network 130 to obtain a variety of network configuration related information, such as PCIs, configured PRS information, and/or timing information used by the base stations in the network. For example, communications interface 890 may make use of the LPP annex (LPPa) protocol defined in 3GPP TS 36.455 or a modification of this protocol to obtain PCI, configured PRS, timing and/or other information from the base stations (e.g. eNodeBs) in network 130. Processing unit 852 may use some or all of the received information to generate OTDOA assistance data information in a manner consistent with disclosed embodiments. Communications interface 890 may also interface with a mobile station to receive location information for OTDOA positioning of the mobile station, including RSTD measurements generated by the mobile station using a first TOA measurement of a first DL signal from the reference cell and a second TOA measurement of a second DL signal from the neighbor cell, along with a first time of measurement for the first TOA measurement and a second time of measurement for the second TOA measurement.

Processing unit 852 may be implemented using a combination of hardware, firmware, and software. For example, processing unit 852 may be configured to perform the functions discussed herein by implementing one or more instructions or program code 858 on a non-transitory computer-readable medium, such as medium 870 and/or memory 854. In some embodiments, processing unit 852 may represent one or more circuits configurable to perform at least a portion of a data signal computing procedure or process related to the operation of server 150. In some embodiments, processing unit 852 may include an RSTD with time epochs 862 module to receive the one or more RSTD measurements per neighbor cell along with associated indications of time epoch within the response time interval. The processing unit 852 may further include an OTDOA position determination 864 module to determine one or more positions of the MS 120 based on the received RSTD measurements acquired during the positioning session. The processing unit 852 may further include a motion determination 866 module, which may use the RSTD measurements and/or multiple position determinations from the positioning session to determine motion of the MS 120, such as an estimate of velocity and direction of travel, during the positioning session. The processing unit 852 may further include an uncertainty 868 module that may adjust the uncertainty of RSTD measurements and/or position determinations based on the motion of the MS 120 during the positioning session.

The methodologies described herein in flow charts and message flows may be implemented by various means depending upon the application. For example, these methodologies may be implemented in hardware, firmware, software, or any combination thereof. For a hardware implementation, the processing unit 852 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 870, which may support the use of non-transitory computer-readable media 858, including removable media. Program code may be resident on non-transitory computer readable media 858 or memory 854 and may be read and executed by processing units 852. Memory may be implemented within processing units 852 or external to processing units 852. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 858 and/or memory 854. Examples include computer-readable media encoded with a data structure and computer-readable media encoded with a computer program. For example, non-transitory computer-readable medium 858 including program code stored thereon may include program code to support OTDOA measurement using OTDOA assistance information in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 890, which may store the instructions/data in memory 854, storage 860 and/or relayed the instructions/data to processing units 852 for execution. For example, communications interface 890 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 854 may represent any data storage mechanism. Memory 854 may include, for example, a primary memory and/or a secondary memory. Primary memory may include, for example, a random access memory, read only memory, nonvolatile RAM, etc. While illustrated in this example as being separate from processing unit 852, it should be understood that all or part of a primary memory may be provided within or otherwise co-located/coupled with processing unit 852. Secondary memory may include, for example, the same or similar type of memory as primary memory and/or storage 860 such as one or more data storage devices 860 including, for example, hard disk drives, optical disc drives, tape drives, a solid state memory drive, etc. In some embodiments, storage 860 may comprise one or more databases that may hold information pertaining to various entities in system 100 and/or the broader cellular network. In some embodiments, information in the databases may be read, used and/or updated by processing units 852 during various computations, including storing capabilities of MS 120, capabilities of server 150, generating OTDOA assistance data, computing a location of MS 120, etc.

In certain implementations, secondary memory may be operatively receptive of, or otherwise configurable to couple to a non-transitory computer-readable medium 858. As such, in certain example implementations, the methods and/or apparatuses presented herein may take the form in whole or part of a removable media drive 870 that may include non-transitory computer readable medium 858 with computer implementable instructions stored thereon, which if executed by at least one processing unit 852 may be operatively enabled to perform all or portions of the example operations as described herein. Computer readable medium 858 may be a part of memory 854.

In certain implementations, a location server for performing Observed Time Difference of Arrival (OTDOA) positioning may include a means for receiving location information from a mobile station for OTDOA positioning of the mobile station, the location information comprising an Reference Signal Time Difference (RSTD) generated by the mobile station using a first TOA measurement of a first downlink (DL) signal from a reference cell and a second TOA measurement of a second DL signal from a neighbor cell, the location information further comprising at least one measurement time, wherein the at least one measurement time is based on a time of measurement for the first TOA measurement and a time of measurement for the second TOA measurement, which may include, e.g., the communications interface 890 and the processing unit 852, and in particular the RSTD with time epochs 862 module. A means for using the location information to determine a location of the mobile station may include, e.g., the processing unit 852 and in particular the OTDOA position determination 864 module.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method of performing Observed Time Difference of Arrival (OTDOA) positioning at a mobile station, the method comprising:
   performing a plurality of time of arrival (TOA) measurements of downlink (DL) signals, the plurality of TOA measurements comprising a first TOA measurement measuring DL signals transmitted from a reference cell, a second TOA measurement measuring DL signals transmitted from a neighbor cell, and a third TOA measurement measuring DL signals transmitted from a second neighbor cell;
   generating a first Reference Signal Time Difference (RSTD) using the first TOA measurement and the second TOA measurement;
   generating a second RSTD using the first TOA measurement and the third TOA measurement; and
   reporting location information to a location server for OTDOA positioning of the mobile station, wherein the location information comprises each of the first RSTD, the second RSTD, a time of the first TOA measurement, a time of the second TOA measurement, and a time of the third TOA measurement, and wherein, for each of the time of the first TOA measurement, the time of the second TOA measurement, and the time of the third TOA measurement, the respective time of the TOA measurement is relative to a common reference time.

2. The method of claim 1, wherein the reporting location information to the location server for OTDOA positioning of the mobile station uses a Long Term Evolution (LTE) Positioning Protocol (LPP).

3. The method of claim 1, wherein the DL signals comprise a positioning reference signal (PRS) for Long Term Evolution (LTE).

4. The method of claim 3, wherein the time of the first TOA measurement and the time of the second TOA measurement includes units of PRS positioning occasions, units of LTE radio frames, units of LTE subframes, a count of system frame number wraparound occasions, a Global Positioning System (GPS) time, a Global Navigation Satellite System (GNSS) time, a Coordinated Universal Time (UTC), or a combination of thereof.

5. The method of claim 1, wherein the location information further comprises at least one additional TOA measurement for at least one of the reference cell and the neighbor cell and a time of the least one additional TOA measurement.

6. A mobile station for performing Observed Time Difference of Arrival (OTDOA), the mobile station comprising:
   a wireless transceiver configured to wirelessly communicate with a wireless network and to receive downlink (DL) signals transmitted from a reference cell and a neighbor cell; and
   at least one processor coupled to the wireless transceiver and configured to perform a plurality of time of arrival (TOA) measurements of the DL signals, the plurality of TOA measurements comprising a first TOA measurement measuring DL signals transmitted from the reference cell, a second TOA measurement measuring DL signals transmitted from a neighbor cell, and a third TOA measurement measuring DL signals transmitted from a second neighbor cell, generate a first Reference Signal Time Difference (RSTD) using the first TOA measurement and the second TOA measurement, generate a second RSTD using the first TOA measurement and the third TOA measurement, and cause the wireless transceiver to report location information to a location server for OTDOA positioning of the mobile station, wherein the location information comprises each of the first RSTD, the second RSTD, a time of the first TOA measurement, a time of the second TOA measurement, and a time of the third TOA measurement, and wherein, for each of the time of the first TOA measurement, the time of the second TOA measurement, and the time of the third TOA measurement, the respective time of the TOA measurement is relative to a common reference time.

7. The mobile station of claim 6, wherein the DL signals comprise a positioning reference signal (PRS) for Long Term Evolution (LTE), and wherein the time of the first TOA measurement and the time of the second TOA measurement includes units of PRS positioning occasions, units of LTE radio frames, units of LTE subframes, a count of system frame number wraparound occasions, a Global Positioning System (GPS) time, a Global Navigation Satellite System (GNSS) time, a Coordinated Universal Time (UTC), or a combination of thereof.

8. The mobile station of claim 6, wherein the location information further comprises at least one additional TOA measurement for at least one of the reference cell and the neighbor cell and a time of the least one additional TOA measurement.

9. A method of performing Observed Time Difference of Arrival (OTDOA) positioning at a location server, the method comprising:
   receiving location information from a mobile station for OTDOA positioning of the mobile station, the location information comprising each of a Reference Signal Time Difference (RSTD) generated by the mobile station using a first TOA measurement of a first downlink (DL) signal measured from the reference cell and a second TOA measurement of a second DL signal measured from the neighbor cell, a time of the first TOA measurement and a time of the second TOA measurement, wherein the location information further comprises each of a second RSTD generated by the mobile station using the first TOA measurement and a third TOA measurement of a third DL signal measured from a second neighbor cell, and a time of the third TOA measurement, and wherein, for each of the time of the first TOA measurement, the time of the second TOA measurement, and the time of the third TOA measurement, the respective time of the TOA measurement is relative to a common reference time.

10. The method of claim 9, wherein the location information from the mobile station is reported using a Long Term Evolution (LTE) Positioning Protocol (LPP).

11. The method of claim 9, wherein the first DL signal and the second DL signal comprise a positioning reference signal (PRS) for Long Term Evolution (LTE).

12. The method of claim 11, wherein the time of the first TOA measurement and the time of the second TOA measurement includes units of PRS positioning occasions, units of LTE radio frames, units of LTE subframes, a count of system frame number wraparound occasions, a Global Positioning System (GPS) time, a Global Navigation Satellite System (GNSS) time, a Coordinated Universal Time (UTC), or a combination of thereof.

13. The method of claim 9, wherein the location information further comprises at least one additional TOA measurement for at least one of the reference cell and the neighbor cell and a time of the least one additional TOA measurement.

14. A location server for performing Observed Time Difference of Arrival (OTDOA) positioning, the location server comprising:
a communications interface configured to communicate with a mobile station; and
at least one processor coupled to the communications interface and configured to receive location information from the mobile station for OTDOA positioning of the mobile station, the location information comprising each of a Reference Signal Time Difference (RSTD) generated by the mobile station using a first TOA measurement of a first downlink (DL) signal measured from the reference cell and a second TOA measurement of a second DL signal measured from the neighbor cell, a time of the first TOA measurement and a time of the second TOA measurement, and use the location information to determine a location of the mobile station, wherein the location information further comprises each of a second RSTD generated by the mobile station using the first TOA measurement and a third TOA measurement of a third DL signal measured from a second neighbor cell, and a time of the third TOA measurement, and wherein, for each of the time of the first TOA measurement, the time of the second TOA measurement, and the time of the third TOA measurement, the respective time of the TOA measurement is relative to a common reference time.

15. The location server of claim 14, wherein the first DL signal and the second DL signal comprise a positioning reference signal (PRS) for Long Term Evolution (LTE), and the time of the first TOA measurement and the time of the second TOA measurement includes units of PRS positioning occasions, units of LTE radio frames, units of LTE subframes, a count of system frame number wraparound occasions, a Global Positioning System (GPS) time, a Global Navigation Satellite System (GNSS) time, a Coordinated Universal Time (UTC), or a combination of thereof.

16. The location server of claim 14, wherein the location information further comprises at least one additional TOA measurement for at least one of the reference cell and the neighbor cell and a time of the least one additional TOA measurement.

* * * * *